(«12») United States Patent
Song et al.

(10) Patent No.: US 9,395,760 B2
(45) Date of Patent: Jul. 19, 2016

(54) MOBILE TERMINAL WITH WATERPROOF SHEET AND MANUFACTURING METHOD

(71) Applicant: Pantech Co., Ltd., Seoul (KR)

(72) Inventors: Byoung Ho Song, Seoul (KR); Kyu Jin Yeon, Seoul (KR); Jong Hwa Choi, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 14/719,857

(22) Filed: May 22, 2015

(65) Prior Publication Data
US 2015/0253814 A1  Sep. 10, 2015

Related U.S. Application Data

(63) Continuation of application No. 13/427,447, filed on Mar. 22, 2012, now Pat. No. 9,042,095.

(30) Foreign Application Priority Data

Sep. 2, 2011  (KR) .......................... 10-2011-0089288

(51) Int. Cl.
*G06F 1/16* (2006.01)
*H05K 5/00* (2006.01)
*H05K 7/00* (2006.01)
(Continued)

(52) U.S. Cl.
CPC ............... *G06F 1/1656* (2013.01); *B32B 37/18* (2013.01); *B32B 38/0012* (2013.01); *G06F 1/1626* (2013.01); *H04B 1/3827* (2013.01); *H04M 1/0202* (2013.01); *H04M 1/0262* (2013.01); *B32B 2307/7265* (2013.01);
(Continued)

(58) Field of Classification Search
CPC ... G06F 1/1626; G06F 1/1613; G06F 1/1601; H04M 1/0202; H04M 1/03
USPC ............... 361/679.21, 679.22, 679.3, 679.55, 361/679.56; 455/575.1
See application file for complete search history.

(56) References Cited

U.S. PATENT DOCUMENTS 6,942,153 B1 * 9/2005 Yuan ..................... G06F 1/1626
235/380
7,941,196 B2 * 5/2011 Kawasaki ............ H04B 1/3888
379/428.01

(Continued)

FOREIGN PATENT DOCUMENTS

CN    10-1155202    6/2011
JP    2009-099677    5/2009
(Continued)

OTHER PUBLICATIONS

Non-Final Office Action issued on Oct. 11, 2013 in U.S. Appl. No. 13/427,447.
(Continued)

*Primary Examiner* — Anthony Haughton
(74) *Attorney, Agent, or Firm* — H.C. Park & Associates, PLC

(57) ABSTRACT

A mobile terminal has a waterproof sheet interposed between a first body portion and a second body portion. The waterproof sheet is formed with a curved shaped or step-like cross-section in consideration of characteristic of internal component or a battery arranged on the first body portion of the mobile terminal, the curved shaped or step-like cross-section is configured to encase, in part or in whole, the internal component or the battery.

21 Claims, 10 Drawing Sheets

(51) Int. Cl.
*H04M 1/00* (2006.01)
*H04M 1/02* (2006.01)
*B32B 37/18* (2006.01)
*B32B 38/00* (2006.01)
*H04B 1/3827* (2015.01)
*H04B 1/38* (2015.01)

(52) U.S. Cl.
CPC .... *B32B 2457/00* (2013.01); *H04B 2001/3894* (2013.01); *Y10T 156/10* (2015.01); *Y10T 156/1002* (2015.01)

(56) References Cited

U.S. PATENT DOCUMENTS

| | | | | |
|---|---|---|---|---|
| 2006/0258325 | A1* | 11/2006 | Tsutaichi | H04M 1/18 455/350 |
| 2008/0081679 | A1 | 4/2008 | Kawasaki et al. | |
| 2011/0211300 | A1 | 9/2011 | Mori et al. | |
| 2012/0040723 | A1* | 2/2012 | Kurihara | H04M 1/0266 455/566 |
| 2013/0027862 | A1* | 1/2013 | Rayner | G06F 1/1656 361/679.3 |

FOREIGN PATENT DOCUMENTS

JP  2009-188488  8/2009
KR  10-2009-0121420  11/2009

OTHER PUBLICATIONS

European Search Report issued on Oct. 24, 2013, in European Patent Application No. 12179667.6.
Final Office Action issued on May 22, 2014, in U.S. Appl. No. 13/427,447.
Notice of Allowance issued on Jan. 21, 2015, in U.S. Appl. No. 13/427,447.
Notice of Allowance issued on Mar. 2, 2015, in U.S. Appl. No. 13/427,447.

* cited by examiner

MOBILE TERMINAL WITH WATERPROOF SHEET AND MANUFACTURING METHOD

CROSS-REFERENCE TO RELATED APPLICATIONS

This application is a continuation of U.S. patent application Ser. No. 13/427,447, filed on Mar. 22, 2012, and claims priority from and the benefit of Korean Patent Application No. 10-2011-0089288, filed on Sep. 2, 2011, which are all hereby incorporated by reference for all purposes as if fully set forth herein.

BACKGROUND

1. Field

Exemplary embodiments of the present invention relate to a mobile terminal with a waterproof sheet and a manufacturing method.

2. Discussion of the Background

Mobile terminals, such as mobile phones, tablet personal computers (PCs), and the like, generally include a number of water-sensitive components. Consequently, a waterproof function is advantageous for the mobile terminals.

An O-ring has typically been used as a waterproofing structure for mobile terminals.

FIG. 1 is an exploded perspective view of a mobile terminal according to a conventional art.

Referring to FIG. 1, the mobile terminal according to the conventional art includes a front casing 1 to provide a front side of the mobile terminal, a rear casing 2 to provide a rear side of the mobile terminal, and an O-ring 3 interposed between the front casing 1 and the rear casing 2.

FIG. 2 is a sectional view of an O-ring of a mobile terminal according to a conventional art.

Referring to FIG. 2, a waterproofing structure for the mobile terminal is configured such that an O-ring 3 surrounds the lateral sides of a casing of the mobile terminal, thereby blocking a gap between the front casing 1 and the rear casing 2. Groove 1a and groove 2a are arranged along the circumference of the front casing 1 and the rear casing 2, respectively, to receive the O-ring 3.

After the O-ring 3 is inserted in the groove 1a of the front casing 1, the rear casing 2 is connected with the front casing 1. Next, the front casing 1 and the rear casing 2 are fastened together, such as by screws and the like.

Thus, since the O-ring 3 is inserted at a connection position between the front casing 1 and the rear casing 2, the gap between the front casing 1 and the rear casing 2 is sealed by the O-ring 3, which may thereby protect internal components of the mobile terminal from water.

According to the conventional waterproofing structure, since a shape of the groove 1a of the front casing 1 may be irregular, the O-ring 3 may require manual connection by an operator. Therefore, a large variation in manufacturing speed may occur as an operator inserts the O-ring 3 into the groove 1a. Accordingly, a manufacturing efficiency and product quality may be decreased.

Furthermore, if the O-ring is distorted by an external shock or damage, a gap may be generated between the front casing 1 and the rear casing 2, thereby reducing the waterproofing efficiency of the O-ring 3. Also, due to the gap, foreign substances, including liquids and/or particles, may more easily enter the mobile terminal and may therefore effect the operation of the mobile terminal.

Moreover, according to the conventional waterproofing structure, the entire thickness of the mobile terminal may be increased due to a thickness of the O-ring 3, which is disadvantageous because of the slimming trend for mobile terminals. In addition, the O-ring 3 is expensive which may increase the manufacturing cost.

According to the conventional waterproofing structure, the waterproofing may be achieved in such a manner that the front casing 1 and the rear casing 2 are connected to each other, with the O-ring 3 interposed between the front casing 1 and rear casing 2. Therefore, the rear casing 2 may need to encase all the internal components of the mobile terminal. However, since the components built in the mobile terminal have different heights, the rear case 2 needs to be formed to cover a height of the tallest internal components. As a result, a shape and design of the rear casing 2 and the front casing 1 are limited. Also, the entire thickness of the mobile terminal maybe increased.

SUMMARY

Exemplary embodiments of the present invention provide a mobile terminal with a waterproof sheet.

Exemplary embodiments of present invention also provide a method of manufacturing a mobile terminal with a waterproof sheet.

Additional features of the invention will be set forth in the description which follows, and in part will be apparent from the description, or may be learned by practice of the invention.

An exemplary embodiment of the present invention discloses a mobile terminal, including: a first body portion; a waterproof sheet connected to the first body portion; and a bonding member interposed between the first body portion and the waterproof sheet, wherein a component is arranged on the first body portion and the waterproof sheet is configured to have a dimension according to at least one of a height, a shape, a function, a material, and an exothermic characteristic of the component.

An exemplary embodiment of the present invention also discloses a method for manufacturing a terminal, comprising: connecting a first surface of a bonding member to a waterproof sheet; connecting a second surface of the bonding member to a first body portion; and connecting a second body portion to the first body portion with the waterproof sheet interposed therebetween, wherein a component is arranged on the first body portion and the waterproof sheet is configured to have a dimension according to at least one of a height, a shape, a function, a material, and an exothermic characteristic of the component.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
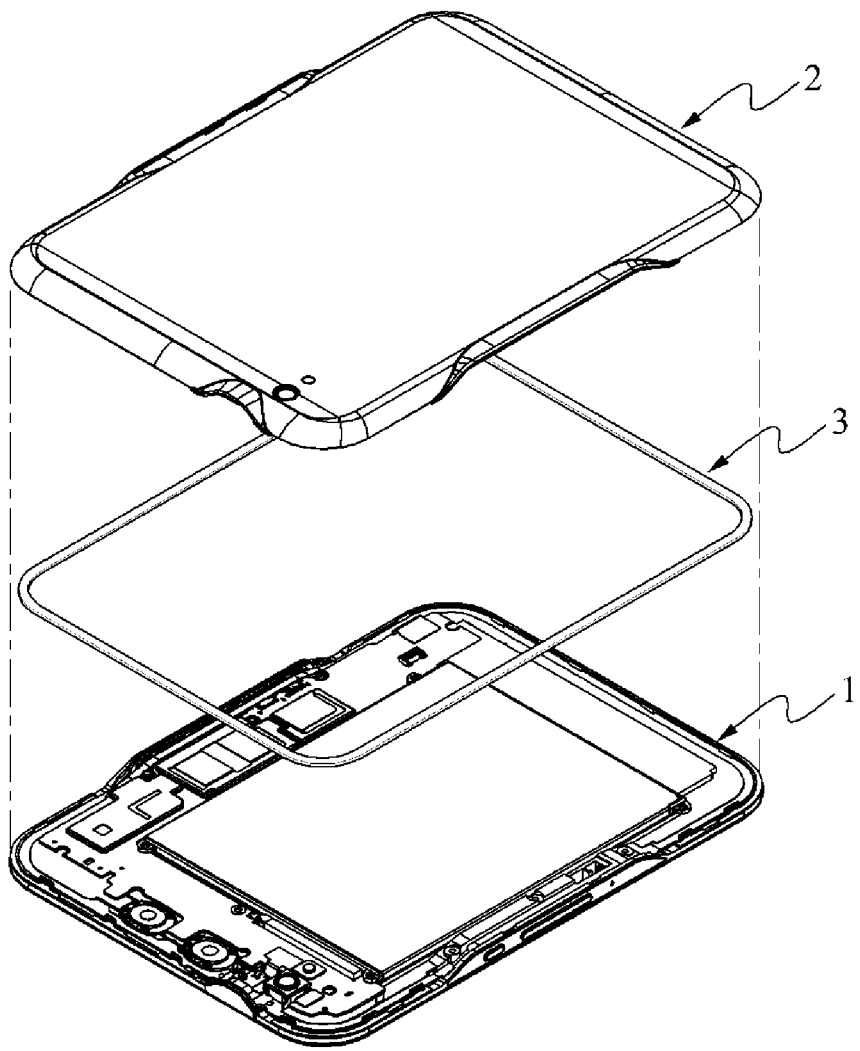
FIG. 1 is an exploded perspective view of a mobile terminal according to a conventional art.
Figure 2:
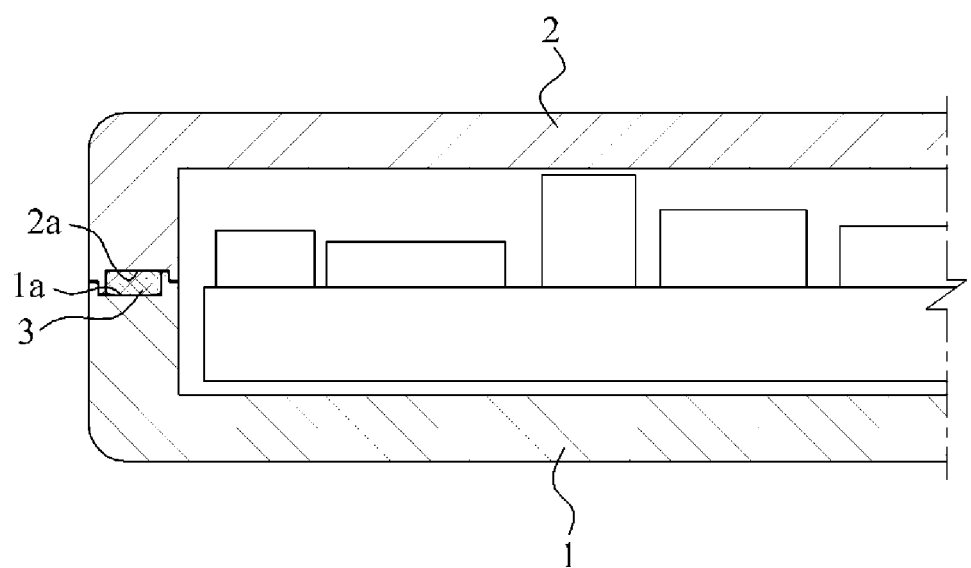
FIG. 2 is a sectional view of an O-ring of a mobile terminal according to a conventional art.

Exemplary embodiments are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, including but not limited to using mechanical fasteners or adhesives or without using adhesives or fasteners, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ). As used in this disclosure, "waterproof" may refer to water resistance, or providing resistance to damage caused by incidental water contact, or waterproofing according to an industry or commercial standard.

Figure 3:
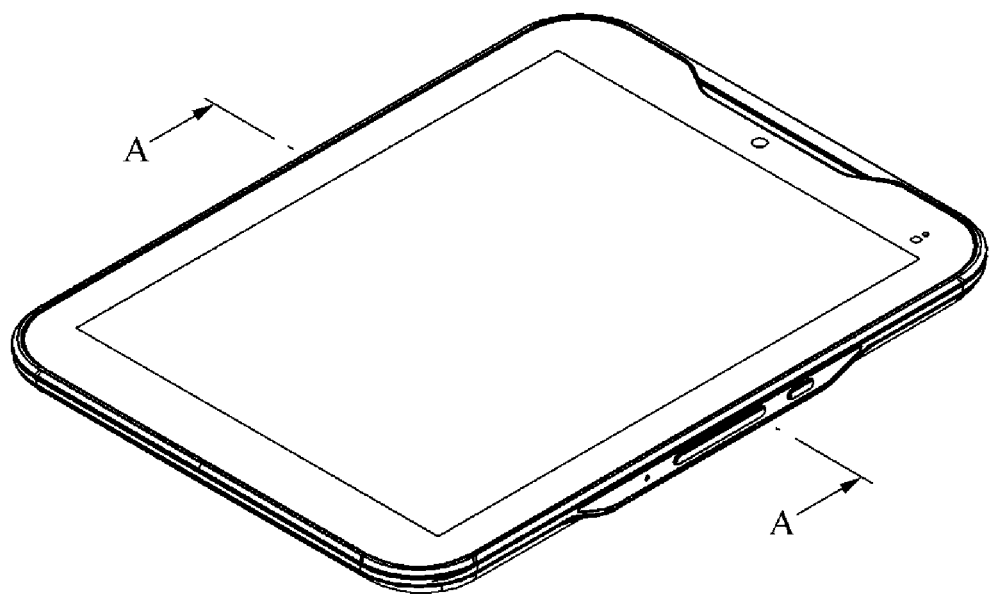
FIG. 3 is a perspective view of a mobile terminal according to an exemplary embodiment of the present invention.
Figure 4:
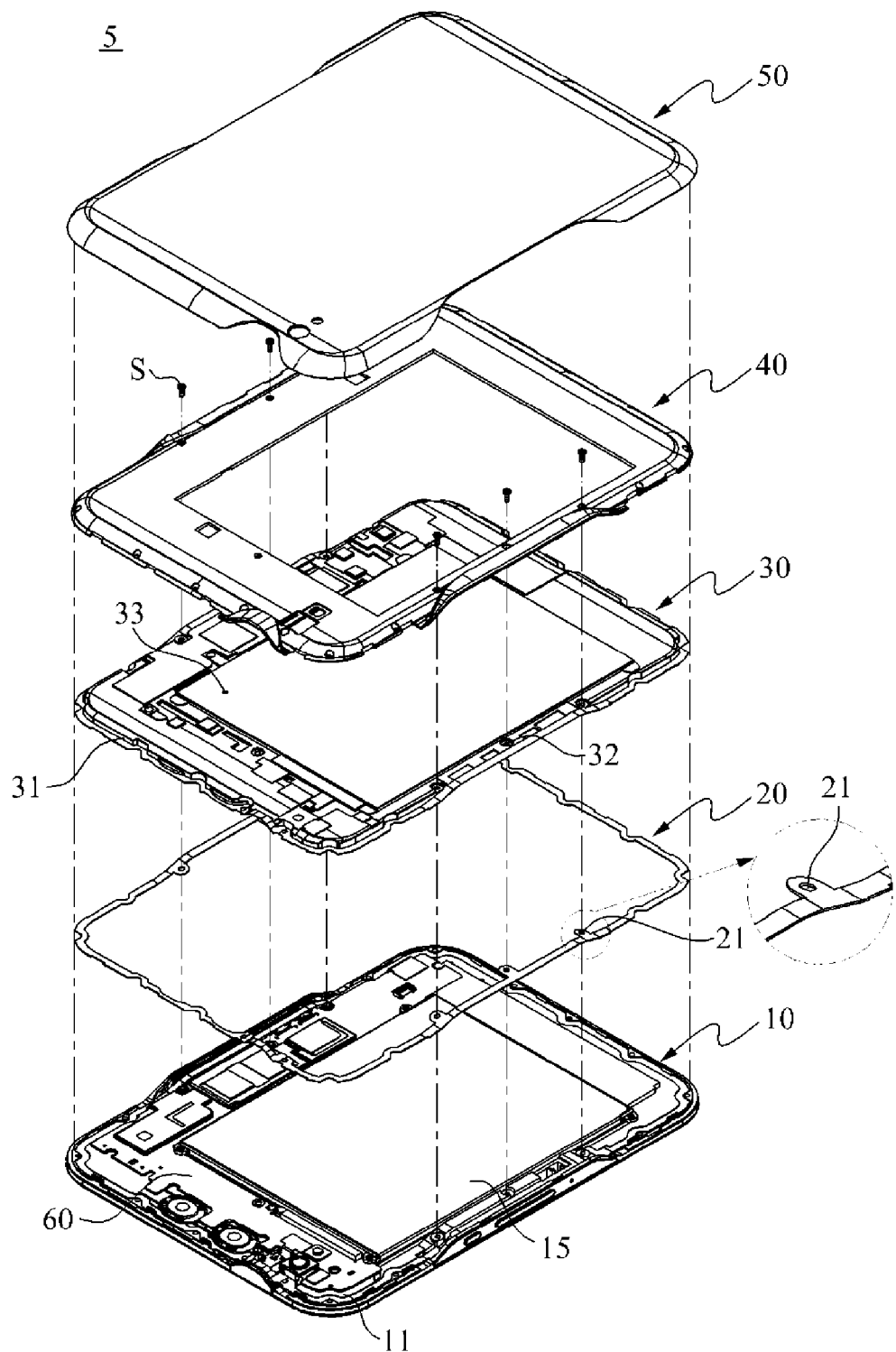
FIG. 4 is an exploded perspective view of the mobile terminal of FIG. 3.

FIG. 3 is a perspective view of a mobile terminal according to an exemplary embodiment of the present invention. FIG. 4 is an exploded perspective view of the mobile terminal of FIG. 3.

Referring to FIG. 3 and FIG. 4, a mobile terminal 5 includes a first body portion 10, a bonding member 20, a waterproof sheet 30, and a second body portion 40. The first body portion 10 and the second body portion 40 may be connected to each other, thereby constructing a casing of the mobile terminal 5. A third body portion 50 may be connected to a rear side of the second body portion 40.

The first body portion 10 may be one external side of the mobile terminal 5. For example, the first body portion 10 may provide a front side of the mobile terminal 5. The first body portion 10 may also be referred to as a front casing.

The first body portion 10 may have any one of various shapes, for example, a rectangular shape. A printed circuit board (PCB) 60 and a battery 15 may be arranged on the first body portion 10. The PCB 60 may be arranged to receive various components.

The first body portion 10 may include components having different heights. The components may include the PCB 60, the components arranged on the PCB 60, and other components not arranged on the PCB 60. The components and the battery 15 may have different heights.

The first body portion 10 includes a bonding member connection portion 11 arranged on a circumference of the first body portion 10 to connect with or receive the bonding member 20. However, the bonding member connection portion 11 may be arranged on another portion of the first body portion 10. The bonding member connection portion 11 may be arranged on a rear surface of the first body portion 10 and further arranged on a circumference of the first body portion 10, an inner surface of the circumference of the first body portion 10, and an outer surface of the circumference of the first body portion 10.

The bonding member connection portion 11 may have a substantially flat shape, or a curved shape that may include at least one step-like structure arranged along the circumference of the first body portion 10.

The waterproof sheet 30 may be connected to or contacted with the first body portion 10 by the bonding member 20, thereby encasing the components. Bonding member 20 may include one or more hole bonding portions 21 to facilitate connection to the first body portion 10 as described in more detail below.

The second body portion 40 may be connected to the first body portion 10. The second body portion 40 may be a visible external body of the mobile terminal 5.

The waterproof sheet 30 and the second body portion 40 will be described in further detail hereinafter.

Figure 5:
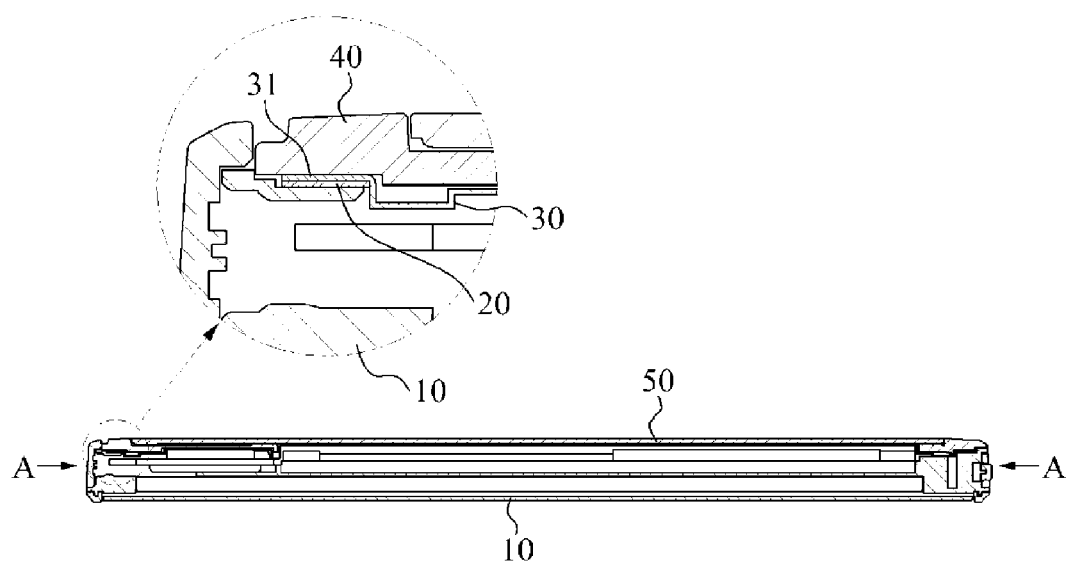
FIG. 5 is a sectional view of the mobile terminal of FIG. 3 along a line A-A.

FIG. 5 is a sectional view of the mobile terminal of FIG. 3 along a line A-A.

Referring to FIG. 5, the bonding member 20 is arranged between the first body portion 10 and the waterproof sheet 30. The bonding member 20 is connected to the waterproof sheet 30 and then connected to the first body portion 10. The bonding member 20 may also be connected to the circumference of the first body portion 10 and then connected to the waterproof sheet 30.

The bonding member 20 may be a double-sided tape, an adhesive, etc. The bonding member 20 may be in the form of a thin band which encloses the first body portion 10.

One surface of the bonding member 20 may be connected to the first body portion 10 while the other surface of the bonding member 20 may be connected to the waterproof sheet 30.

Referring again to FIG. 4, the bonding member 20 may include a hole bonding portion 21 connected to a fastening member hole 32 arranged on the waterproof sheet 30. The fastening member hole 32 will be described hereinafter. The hole bonding portion 21 may be configured to surround the fastening member hole 32. The hole bonding portion 21 may have a hole-like shape and may be configured to allow a fastening member S to pass there through.

Figure 6:
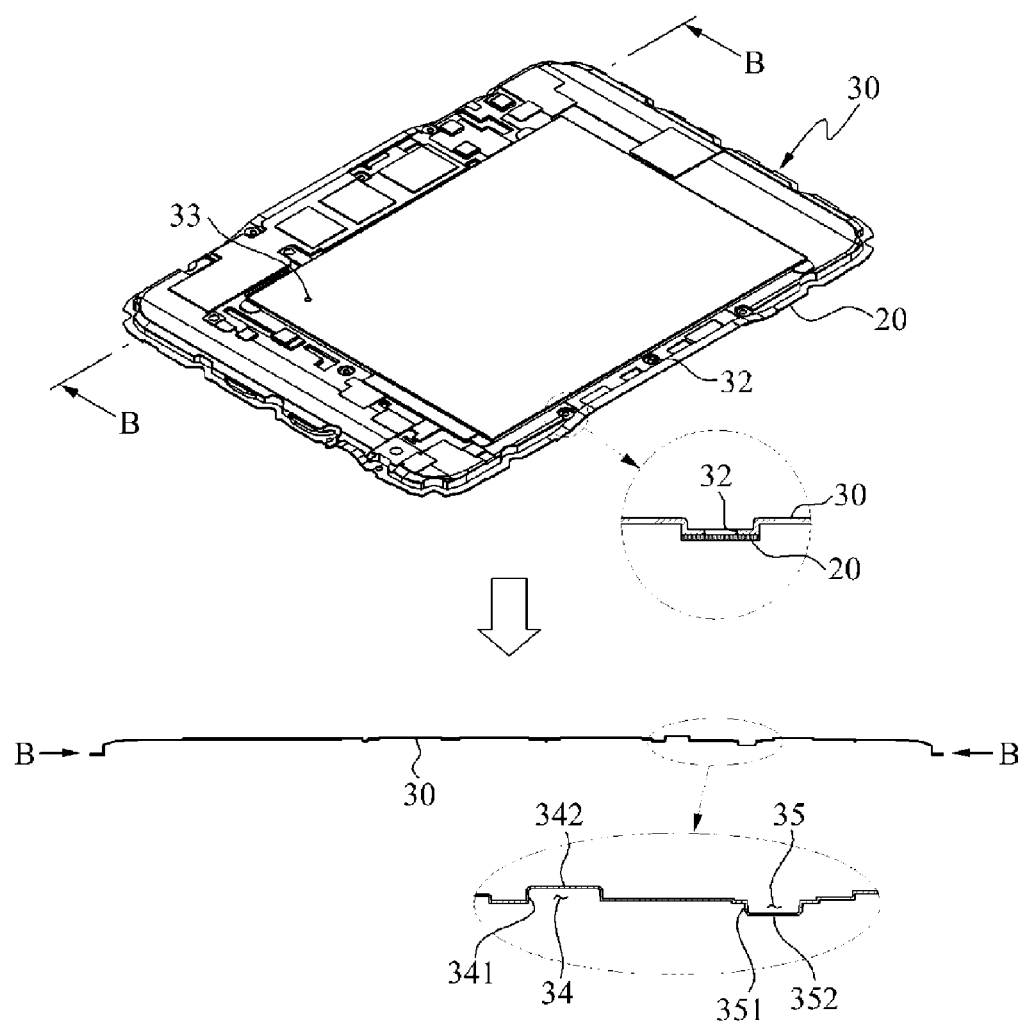
FIG. 6 is a perspective view of a waterproof sheet according to an exemplary embodiment of the present invention.
Figure 7:
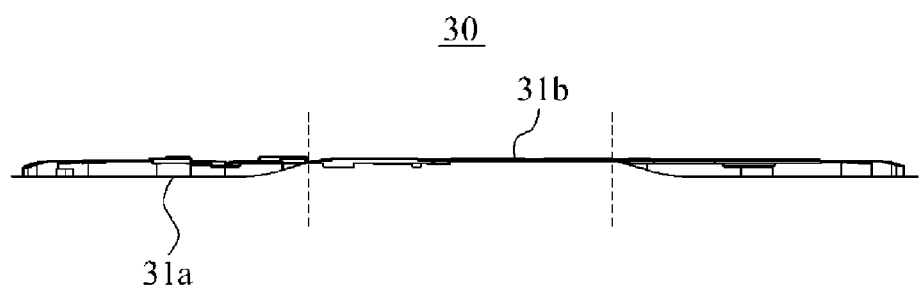
FIG. 7 is a side view of the waterproof sheet of FIG. 6.

FIG. 6 is a perspective view of a waterproof sheet according to an exemplary embodiment of the present invention. FIG. 7 is a side view of the waterproof sheet of FIG. 6.

Referring to FIG. 6 and FIG. 7, the waterproof sheet 30 may be connected to the first body portion 10 by the bonding member 20. The waterproof sheet 30 may partially or entirely encase the components arranged on the first body portion 10 along with the first body portion 10 and accordingly may protect the components from water damage.

Figure 10:
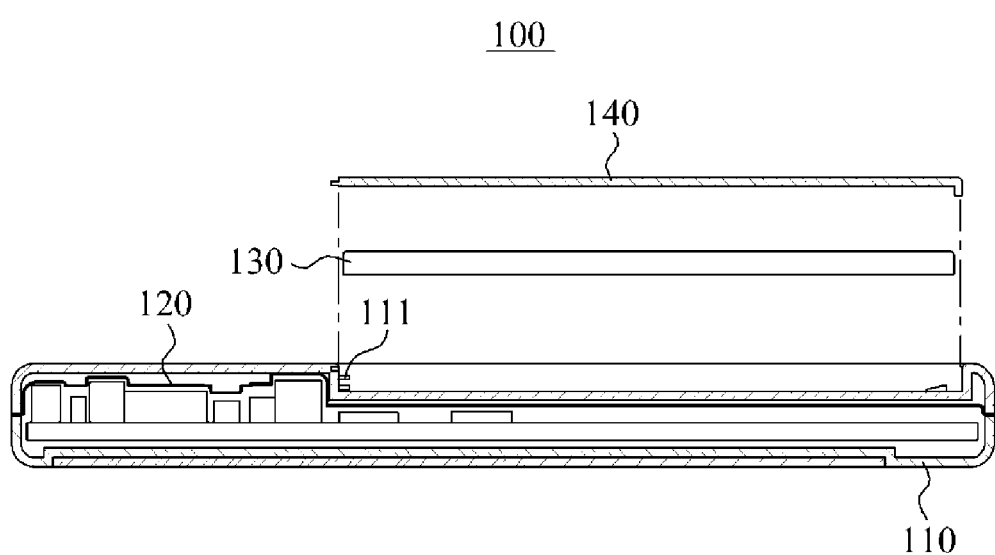
FIG. 10 is a diagram schematically illustrating a mobile terminal according to an exemplary embodiment of the present invention.

If the battery 15 is a built-in type battery, which may be built-in to the casing of the mobile terminal 5, the waterproof sheet 30 may be connected to the first body portion 10 with the battery 15 interposed between the waterproof sheet 30 and the first body portion 10. If the battery 15 is a detachable type battery, as shown in FIG. 10, the waterproof sheet 30 may be connected to the first body portion 10 such that it does not encase the battery 15.

The waterproof sheet 30 and the first body portion 10 may form a space interposed therebetween so that the components may be arranged in the space. The waterproof sheet 30 may be formed in a curved shape in consideration of shapes, heights, functions, materials, exothermic characteristics, and the like of components arranged on the first body portion 10. According to the shapes, heights, functions, materials, and exothermic characteristics of components, the waterproof sheet 30 may contact, be connected to, or be arranged proximately to, or separated from some of the components arranged on the first body portion 10.

The bonding member 20 may be interposed between a circumference of the waterproof sheet 30 and the first body portion 10.

Although the waterproof sheet 30 is described as connect to the rear surface of the circumference of the first body portion 10, the exemplary embodiments are not limited thereto. The waterproof sheet 30 may be connected to an outer surface of the first body portion 10 to encase the circumference of the first body portion 10, or to the inner surface of the circumference of the first body portion 10.

The waterproof sheet 30 may contact, be connect to, or be arranged proximately to the first body portion 10 and the bonding member 20, and may thereby hermetically seal the components arranged on the first body portion 10 from water entry.

The waterproof sheet 30 may have a curved shape corresponding to the shape of the components arranged on the first body portion 10 or the battery 15 arranged on the first body portion 10.

For example, the waterproof sheet 30 may extend to encase a relatively tall component arranged on the first body portion 10 or may depress inward to enclose a relatively short component arranged on the first body portion 10.

The waterproof sheet 30 may directly contact, be directly connect to, or separated from a component arranged on the first body portion 10, according to the shape, height, function, material, exothermic characteristics, and the like of the component arranged on the first body portion 10.

Whether a space is provided between the waterproof sheet 30 and the component arranged on the first body portion 10 may depend upon a function of the component. For example, a speaker may have a reference space for resonance, and the waterproof sheet 30 may form a space to be separated from the speaker rather than directly connected to or contacting the speaker. The waterproof sheet 30 may protrude at a position corresponding to the speaker so as to form the space. As another example, some components such as a subscriber identity module (SIM) port, a memory card port, and a universal serial bus (USB) port may be moved according to a card insertion operation. The waterproof sheet 30 may form a reference space to allow movement of these components.

Power-related components such as a power management integrated circuit (PMIC) may be separated by a space from the waterproof sheet 30 due to an exothermic characteristic of the components. The components such as the PMIC generate heat and the waterproof sheet 30 may be separated from the PMIC to permit heat radiation, rather than being directly in contact with or directly connected thereto. Therefore, the waterproof sheet 30 may be separated by a reference distance from the PMIC, for example, by protruding at a corresponding position.

Whether a space is provided between the waterproof sheet 30 and the component arranged on the first body portion 10 may depend upon the material of the component arranged on the first body portion 10. For example, ceramic based components may be sensitive to external shock and the waterproof sheet 30 may be separated from the ceramic based component arranged on the first body portion 10 to form a space therebetween.

The waterproof sheet 30 may have a step-like structure corresponding to the shape of the components arranged on the first body portion 10 or the battery 15. The waterproof sheet 30 may protrude from a first height at a position enclosing a relatively tall component and may be depressed from the first height at a position enclosing a relatively short component. The step-like structure may have a right angle. However, the waterproof sheet 30 may also have a smooth curve between differing heights at the protruding or depressed portion.

The waterproof sheet 30 may be configured such that a cross section may be curved according to protruding heights, shapes, functions, materials, and exothermic characteristics of the respective components arranged on the first body portion 10. Therefore, a vertical cross section of the waterproof sheet 30 may be extended horizontally, bent vertically upward at a position corresponding to a protruding component, extended horizontally to cover the protruding component, bent vertically downward after the protruding component, and then extended horizontally again.

Referring to the bottom portion of FIG. 6, the waterproof sheet 30 may include a protruding portion 34 to cover the protruding component and a depressed portion 35 to contact, connect to, or be arranged proximately to a relatively short component. The protruded portion 34 includes a vertical rising portion 341 and a horizontal portion 342. The depressed portion 35 includes a vertical falling portion 351 and a horizontal portion 352.

The waterproof sheet 30 may include a step portion to cover the protruding component.

The waterproof sheet 30 may be manufactured into a reference shape by vacuum forming or pressing, etc.

Referring again to FIG. 4 and FIG. 5, a circumference of the waterproof sheet 30 may include the bonding member connection portion 31 to connect to the bonding member 20. The bonding member connection portion 31 may be arranged on other locations of the waterproof sheet 30. The bonding member connection portion 31 may have a step-like structure.

Referring to FIG. 4, the circumference of the waterproof sheet 30 may have a shape corresponding to the circumference of the first body portion 10. The circumference of the first body portion 10 may have a curved shape with a varied height. The waterproof sheet 30 may have a relatively tall portion and a relatively short portion corresponding to the curved shape of the circumference of the first body portion 10.

The circumference of the waterproof sheet 30 may be connected to an inner surface of the circumference of the first body portion 10 or connected to the outer surface of the circumference of the first body portion 10. The circumference of the waterproof sheet 30 may be shaped to correspond to the circumference of the first body portion 10.

The bonding member connection portion 31 may have a flat shape without a step-like structure according to the shape of the first body portion 10. In FIG. 7, the bonding member connection portion 31 includes a step-like structure which includes step portion 31a and a non-step portion 31b. The step portion 31a may be relatively short in comparison with the other portion of the waterproof sheet 30. The non-step portion 31b may have substantially the same height as the other portions of the waterproof sheet 30.

Since the circumference of the waterproof sheet 30 may be shaped to correspond to the first body portion 10 and the components arranged thereon, whether the bonding member connection portion 31 includes the step-like structure may be determined by the shape of the first body portion 10 and its components.

The waterproof sheet 30 may be configured to correspond to a size of one or more of the components arranged on the first body portion 10 or may be configured to encase all of the component arranged on the first body portion 10. For example, the waterproof sheet 30 may be connected to the PCB 60. The waterproof sheet 30 may be connected to the circumference of the first body portion 10 and may encase all components arranged on the first body portion 10. The waterproof sheet 30 may be connected to the PCB 60 by the bonding member 20. The waterproof sheet 30 may encase each component arranged on the first body portion 10 individually.

The waterproof sheet 30 may be made of a plastic material such as polycarbonate plastic, polyethylene terephthalate (PET), and the like and may provide waterproofing to the mobile terminal 5. The waterproof sheet 30 may be made of a heat radiating material and may discharge heat generated from the components arranged on the first body portion 10. Any material generally known to radiate heat and that may be shaped appropriately and possessing a threshold level of water resistance may be used for the heat radiation sheet.

Figure 8:
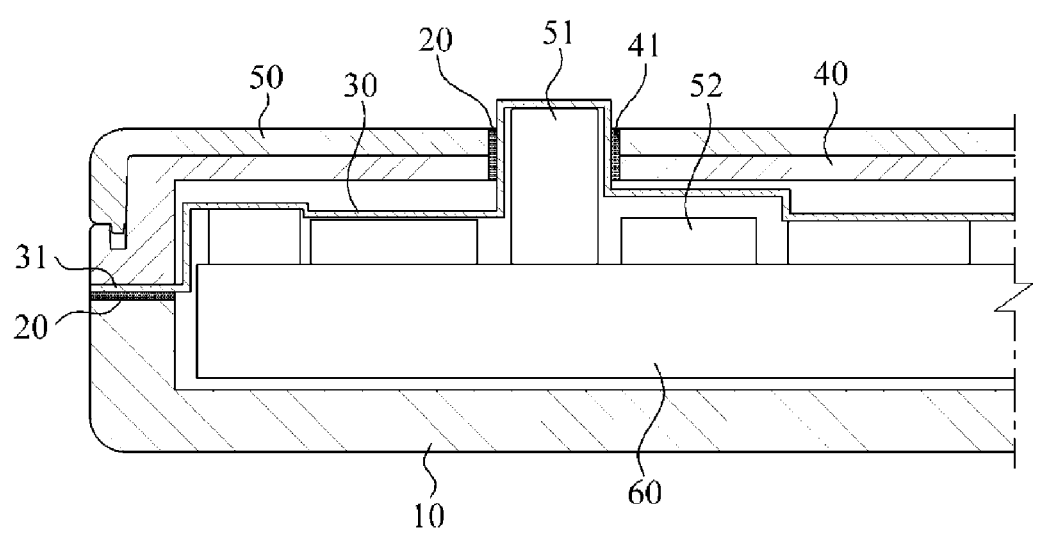
FIG. 8 is a sectional view illustrating a mobile terminal according to an exemplary embodiment of the present invention.

FIG. 8 is a sectional view illustrating a mobile terminal according to an exemplary embodiment of the present invention.

Referring to FIG. 8, the waterproof sheet 30 may encase in part or in whole the components arranged on the first body portion 10 and/or the battery 15. The waterproof sheet 30 may contact or be connected to some of the components arranged on the first body portion 10 while being separated from other components arranged on the first body portion 10.

Examples of components contacting or connected to the waterproof sheet 30 will be described hereafter. The waterproof sheet 30 may contact or be connected to a component arranged on the first body portion 10 that may fall off or detach during use, such as various connectors, including a flexible PCB (FPCB) connector and a battery connector, a component arranged on the first body portion 10 that is connected to the waterproof sheet 30 to transmit vibrations such as a motor, and a component arranged on the first body portion 10 that may be damaged by entry of a foreign substances or moisture during use such as a camera, complementary metal-oxide-semiconductor (CMOS) sensor chip, and a liquid crystal display (LCD).

Referring again to FIG. 4, the waterproof sheet 30 may include a camera hole 33 arranged on a position corresponding to a camera lens. A window may be connected to the camera hole 33. A circumference of the window may be connected to the waterproof sheet by a double-sided tape or an adhesive, the double-sided tape or adhesive may prevent water from entering through the camera hole 33.

Some of the components arranged on the first body portion may move according to a card insertion operation, such as the SIM port, the memory card port, and the USB port. Components capable of movement may be separated from the waterproof sheet 30 due to their functions. The power-related components arranged on the first body portion, such as the PMIC, may be separated from the waterproof sheet 30 due to an exothermic characteristic of the components. Ceramic components arranged on the first body portion may be separated from the waterproof sheet 30 due to their material.

Referring again to FIG. 4 and FIG. 6A, the waterproof sheet 30 may include a fastening member hole 32 configured to allow for passage of the fastening member S to fasten the first body portion 10 and the second body portion 40 together. The fastening member may be a screw, a bolt, or other mechanical fastener.

The bonding member 20 may be connected around the fastening member hole 32.

Referring to FIG. 4, as the fastening member hole 32 contacts or is connected to the first body portion 10, in particular with a connection portion of the fastening member S, by using the hole bonding portion 21 of the bonding member 20 the generation of a gap between the waterproof layer and the first body portion may be prevented, accordingly providing the waterproof function of the waterproof sheet. Although the fastening member hole 32 is depicted at a position corresponding to the circumference of the first body portion 10, the fastening member hole 32 may be arranged at other positions.

Entry of water through the fastening member hole 32 may be reduced by arranging the bonding member 31 to surround the fastening member hole 32.

Referring again to FIG. 8, the second body portion 40 may be connected to the first body portion 10 with the waterproof sheet 30 interposed between the first body portion 10 and the second body portion 40. The second body portion 40 may be connected to the first body portion 10 by a fastening member such as a screw and the like. The second body portion 40 may be connected to the first body portion 10 by a protrusion and the like.

The second body portion 40 may include an opening 41 arranged at a position corresponding to a tallest component 51 arranged on the first body portion 10. For example, a battery may be exposed through the opening 41. The tallest component 51 may be exposed outside of the second body portion 40 or the third body portion 50 through the opening 41. The exposed component 51 may be encased by the waterproof sheet 30. Therefore, the waterproof sheet 30 may be partially exposed outside the second body portion 40 or the third body portion 50 through opening 41.

The bonding member 20 may be interposed between the opening 41 and the component 51 to achieve a waterproofing function.

The opening 41 may be provided in the second body portion 40 since the waterproof sheet 30 encases the component 51 arranged on the first body portion 10.

Thus, the entire thickness of the casing may not be increased due to the height of the tallest component 51, simply by forming the opening 41 at the position corresponding to the tallest component 51. As a result, the thickness of the mobile terminal may be reduced. Additionally, this may allow for greater flexibility in the design of the mobile terminal 5. The third body portion 50 may be further provided to cover the second body portion 40. The third body portion 50 may cover an entire area of the second body portion 40 or may cover the opening 41. If the third body portion 50 covers the entire area of the second body portion 40, the fastening member may not be visible.

If the third body portion 50 covers the opening 41, the exposed portion of the second body portion 40 may be thinner.

Figure 9:
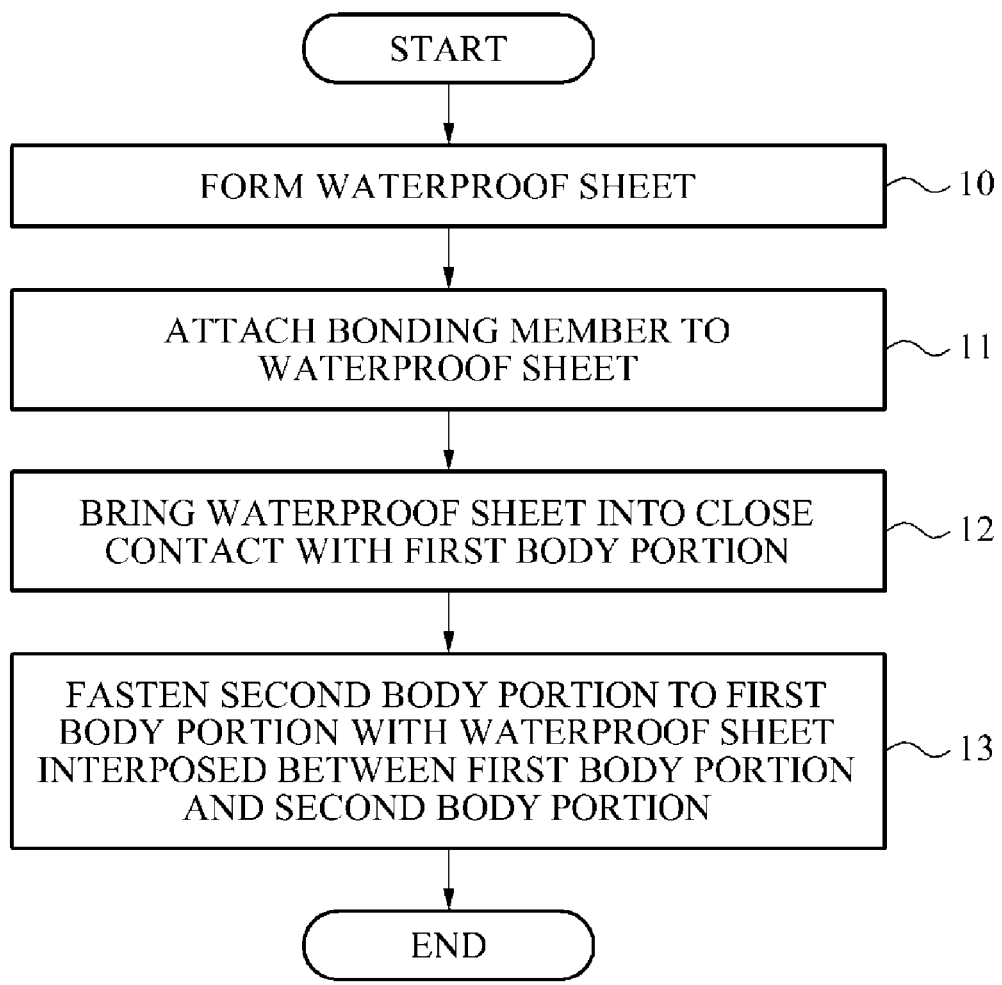
FIG. 9 is a flowchart illustrating a method for manufacturing a mobile terminal according to an exemplary embodiment of the present invention.

FIG. 9 is a flowchart illustrating a method for manufacturing a mobile terminal according to an exemplary embodiment of the present invention. The method for manufacturing the mobile terminal will be described as if manufacturing the mobile terminal 5 shown in FIG. 4, but is not limited as such.

Referring to FIG. 9, in operation 10, a waterproof sheet 30 is formed into a 3-dimensional (3D) shape corresponding to a shape of components or a battery arranged on a casing of the mobile terminal 5. The components arranged on the casing may have various heights and the waterproof sheet 30 may contact, or be connected to, or separated from the components according to heights, functions, materials, exothermic characteristics and the like of the components arranged on the casing. The waterproof sheet 30 may be formed into a curved shape in consideration of at least one of the heights, functions, materials, and exothermic characteristics. A vertical cross section of the waterproof sheet 30 encasing a component arranged on the casing may appear to extended horizontally and then extended vertically upward at a position corresponding to a component and then extended horizontally again to encase the component and then extended vertically downward after the component, and finally extended horizontally again.

The waterproof sheet 30 may be manufactured into a reference shape by vacuum forming, pressing, etc.

In operation 11, one surface of a bonding member 20 may be connected to the waterproof sheet 30. The bonding member 20 may be a double-sided tape. However, one surface of the bonding member 20 may alternatively be connected to a first body portion 10 initially. The bonding member 20 may be connected to the first body portion 10 along a circumference of the first body portion 10.

In operation 12, the waterproof sheet 30 is connected to the first body portion 10 by connecting the other adhesive surface of the bonding member 20 to the first body portion 10. The waterproof sheet 30 may be connected to the first body portion 10 with the bonding member 20 interposed therebetween, thereby covering at least one of the components or the battery arranged on the first body portion 10. If one surface of the bonding member 20 was initially connected to the first body portion 10, the waterproof sheet 30 may be connected to the other adhesive surface of the bonding member 20.

In operation 13, the second body portion 40 is connected to the first body portion 10 with the waterproof sheet 30 interposed therebetween. The second body portion 40 may be connected to the first body portion 10 by a fastening member S. The fastening member may pass through the waterproof sheet 30.

The waterproof sheet may be connected to the casing by attaching a bonding member to the waterproof sheet. Therefore, automated assembly of the mobile terminal 5 may be possible.

Also, the waterproof sheet 30 and the bonding member 20 may be thinner than a conventional O-ring, and the thickness of the casing may be reduced.

Although exemplary embodiments have been described with reference to a mobile terminal, the present invention is not limited thereto. The present invention may be applicable to other electronic appliances which may include a waterproof function, such as a laptop computer, a keyboard, a monitor, a TV, and other display devices.

FIG. 10 is a diagram schematically illustrating a mobile terminal according to an exemplary embodiment of the present invention.

Referring to FIG. 10, a mobile terminal 100 may include a body portion 110, a waterproof sheet 120 connected to the body portion 110, a battery 130, and a battery cover 140.

Various components may be arranged on the body portion 110. The waterproof sheet 120 is connected to the body portion 110 by a bonding member or the like, thereby achieving a waterproof function. The waterproof sheet 120 does not encase the battery 130 since the battery 130 is not built into the body portion 110 along with other components but is selectively detached as necessary, for example for recharging or replacement.

The body portion 110 may include a terminal portion 111 to electrically connect with the battery 130. The terminal 111 may be arranged on an outside of the waterproof sheet 120 like the battery 130 and therefore may be exposed outside from of the waterproof sheet 120.

The battery cover 140 may be connected to an outside of the body portion 110 to selectively cover the battery 130.

FIG. 10 differs from FIG. 3 in that the waterproof sheet does not cover the battery based on a design choice to use a detachable type battery.

The battery may be separately protected from water. The terminal portion 111 may be partially protected from water by an O-ring or a waterproof sheet connected with a bonding member. Accordingly, if the battery is a detachable-type battery internal components of the mobile terminal 100 and the battery may be protected from water.

Figure 11A:
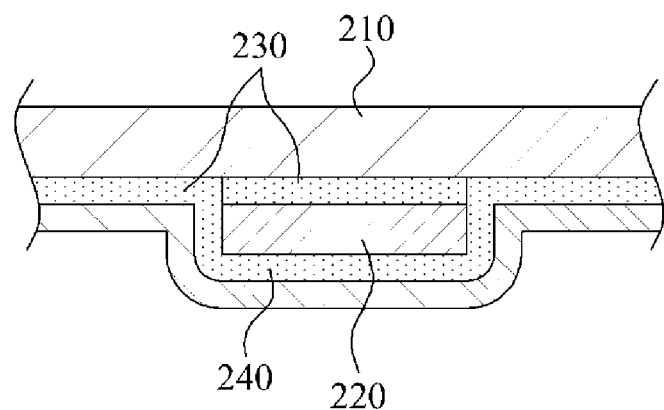
FIG. 11A is a diagram illustrating a flexible printed circuit board of a mobile terminal according to an exemplary embodiment of the present invention.
Figure 11B:
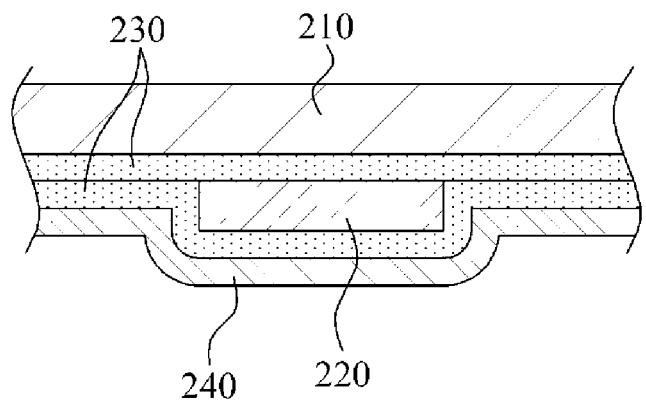
FIG. 11B is a diagram illustrating a flexible printed circuit board of a mobile terminal according to an exemplary embodiment of the present invention.

FIG. 11A is a diagram illustrating a flexible printed circuit board of a mobile terminal according to an exemplary embodiment of the present invention. FIG. 11B is a diagram illustrating a flexible printed circuit board of a mobile terminal according to an exemplary embodiment of the present invention.

Referring to FIG. 11A and FIG. 11B, the mobile terminal may include a FPCB 220. The FPCB 220 may pass through a waterproof sheet 240 and extend to an outside of a body portion 210 for data transmission. That is, the FPCB 220 may be arranged between the body portion 210 and the waterproof sheet 240.

A bonding member 230 may be connected to the FPCB 220 to block gaps between the FPCB 220 and holes or recesses of the body portion 210. The bonding member 230 may be connected to surround a circumference of the FPCB 220.

The bonding member 230 may connected around the FPCB 220, the body portion 210, the FPCB 220, and the waterproof sheet 240 as shown in FIG. 11A and FIG. 11B.

Unlike in FIG. 11A, FIG. 11B includes two layers of bonding member 230 connected to the FPCB 220. A first bonding member 231 is connected to the body portion 210 to which the FPCB 220 is connected. A second bonding member 232 is connected to the first bonding member 231 and the FPCB 220. Conversely, in FIG. 11A, the bonding member 230 includes a first layer that is localized between FPCB 220 and body portion 210, so that there is a single layer of the bonding member 230 between waterproof sheet 240 and body portion 210.

According to embodiments of the present invention, a bonding member is connected to a waterproof sheet so that the waterproof sheet may be connected to a casing of a mobile terminal. This may eliminate the need for manual connection of the waterproof sheet to the casing and may increase a manufacturing efficiency.

In addition, according to embodiments of the present invention, since the waterproof sheet and the bonding member have a relatively small thickness, the entire thickness of the casing may be reduced when compared to the conventional art using an O-ring.

In addition, according to embodiments of the present invention, manufacturing cost may be reduced by employing the waterproof sheet because the waterproof sheet may be less expensive than the O-ring.

In addition, according to embodiments of the present invention, a method of attaching a sheet to a surface is described which may protect a mobile terminal from the entrance of foreign substances.

In addition, according to embodiments of the present invention, a waterproofing function may not be reduced by an external shock deforming a casing of a mobile terminal.

In addition, according to embodiments of the present invention, an opening may be arranged on a rear casing of a mobile terminal at a position corresponding to the tallest internal component. This may allow for greater flexibility in designing a shape of the rear casing.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal, comprising:
   a first body portion;
   a waterproof sheet connected to the first body portion; and
   a bonding member interposed between the first body portion and the waterproof sheet,
   wherein a component is arranged on the first body portion and a portion of the waterproof sheet is configured to be protruding or depressed over the component,
   wherein the waterproof sheet comprises a fastening member hole, and
   wherein the bonding member comprises a hole bonding portion configured to surround the fastening member hole.

2. The mobile terminal of claim 1, further comprising:
   a second body portion connected to first body portion with the waterproof sheet and the bonding member interposed therebetween,
   wherein a battery of the mobile terminal is arranged in a space between the waterproof sheet and the first body portion.

3. The mobile terminal of claim 2, further comprising:
   a third body portion connected to the second body portion.

4. The mobile terminal of claim 3, wherein the second body portion and the third body portion are exposed to the outside of the mobile terminal.

5. The mobile terminal of claim 2, wherein the component is arranged on the first body portion and the second body portion is configured to have an opening at a position corresponding to the location of the component.

6. The mobile terminal of claim 1, wherein the waterproof sheet has a substantially step-like cross-section.

7. The mobile terminal of claim 1, wherein the waterproof sheet has a substantially curved cross-section.

8. The mobile terminal of claim 1, wherein the component is arranged to protrude from the first body portion.

9. The mobile terminal of claim 2, wherein the waterproof sheet is arranged between the second body portion and the component.

10. The mobile terminal of claim 1, wherein the bonding member is arranged on a circumference of the first body portion.

11. The mobile terminal of claim 1, wherein the bonding member is a double-sided tape.

12. The mobile terminal of claim 1, wherein the bonding member is an adhesive.

13. The mobile terminal of claim 1, wherein the waterproof sheet is a polycarbonate plastic.

14. The mobile terminal of claim 1, wherein the waterproof sheet is a polyethylene terephthalate.

15. A method for manufacturing a terminal, comprising:
   connecting a first surface of a bonding member to a waterproof sheet;
   connecting a second surface of the bonding member to a first body portion; and
   connecting a second body portion to the first body portion with the waterproof sheet interposed therebetween,
   wherein a component is arranged on the first body portion and a portion of the waterproof sheet is configured to be protruding or depressed over the component according to at least one of a height, a shape, a function, a material, and an exothermic characteristic of the component,
   wherein the waterproof sheet comprises a fastening member hole, and
   wherein the bonding member comprises a hole bonding portion configured to surround the fastening member hole.

16. The method of claim 15, further comprising, forming the waterproof sheet into a reference shape.

17. The method of claim 16, wherein the forming the waterproof sheet into a reference shape comprises vacuum forming the waterproof sheet.

18. The method of claim 16, wherein the forming the waterproof sheet into a reference shape comprises pressing the waterproof sheet.

19. A mobile terminal, comprising:
   a first body portion;
   a waterproof sheet connected to the first body portion; and
   a bonding member interposed between the first body portion and the waterproof sheet,
   wherein a component is arranged on the first body portion and a portion of the waterproof sheet is configured to be protruding or depressed over the component, and
   wherein a battery of the mobile terminal is arranged in a space between the waterproof sheet and the first body portion.

20. The mobile terminal of claim 19, wherein a surface portion of the waterproof sheet is configured to have a dimension according to at least one of a height, a shape, a function, a material, and an exothermic characteristic of the component.

21. The mobile terminal of claim 1, wherein the portion of the waterproof sheet is configured to be protruding or depressed over the component according to at least one of a height, a shape, a function, a material, and an exothermic characteristic of the component.

* * * * *